US006537651B2

(12) United States Patent
Geurtsen et al.

(10) Patent No.: US 6,537,651 B2
(45) Date of Patent: Mar. 25, 2003

(54) HEAT-TRANSFER LABEL ASSEMBLY

(75) Inventors: Friedrich H. H. Geurtsen, Holliston, MA (US); Mukund Patel, Marlboro, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/766,306

(22) Filed: Jan. 19, 2001

(65) Prior Publication Data

US 2002/0136866 A1 Sep. 26, 2002

(51) Int. Cl.[7] .............................. B32B 3/00; B32B 7/12

(52) U.S. Cl. ....................... 428/202; 428/195; 428/348; 428/349; 428/352; 428/200; 428/913; 428/914

(58) Field of Search ................................ 428/195, 500, 428/914, 202, 349, 352, 913, 348, 346, 200; 156/239, 240, 289

(56) References Cited

U.S. PATENT DOCUMENTS 3,922,432 A 11/1975 Asnes
4,927,709 A 5/1990 Parker et al.
4,935,300 A 6/1990 Parker et al.
5,800,656 A 9/1998 Geurtsen et al.
6,033,763 A 3/2000 Laprade et al.
6,083,620 A 7/2000 Laprade et al.
6,099,944 A 8/2000 Laprade et al.

FOREIGN PATENT DOCUMENTS

EP 819726 1/1998

*Primary Examiner*—Deborah Jones
*Assistant Examiner*—Ling Xu
(74) *Attorney, Agent, or Firm*—Kriegsman & Kriegsman

(57) ABSTRACT

A heat-transfer label assembly. In one embodiment, the assembly comprises a carrier, the carrier comprising a paper substrate overcoated with a layer of polyethylene. The polyethylene layer is overcoated with a skim coat of wax. One or more heat-transfer labels are printed onto the skim coat and are spaced apart from one another, each label comprising a protective lacquer layer printed onto the skim coat, an ink design printed onto the protective lacquer layer, and a heat-activatable adhesive layer printed over the ink design, any exposed areas of the protective lacquer layer and a surrounding area of the skim coat. The periphery of the skim coat extends beyond the periphery of the label and is, therefore, uncovered by the label. The assembly further comprises a mask deposited over the uncovered areas of the skim coat, the mask adhering to the polyethylene layer during label-transfer and preventing transfer onto an article of the previously uncovered areas of the skim coat together with the label.

26 Claims, 10 Drawing Sheets

HEAT-TRANSFER LABEL ASSEMBLY

BACKGROUND OF THE INVENTION

The present invention relates generally to heat-transfer label assemblies and more particularly to a novel heat-transfer label assembly.

Heat-transfer labels are implements commonly used to decorate and/or to label commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed. Heat-transfer labels are typically constructed as part of a heat-transfer label assembly, with one or more heat-transfer labels printed on a removable carrier web.

One of the earliest types of heat-transfer label assemblies is described in U.S. Pat. No. 3,616,015, inventor Kingston, which issued October, 1971, and which is incorporated herein by reference. In the aforementioned patent, there is disclosed a heat-transfer label assembly comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt. This enables the paper sheet to be released from the ink design layer, with a portion of the wax layer being transferred with the ink design layer onto the article and with a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming or post-heating technique which enhances the optical clarity of the wax protective layer (thereby enabling the ink design layer therebeneath to be better observed) and which enhances the protective properties of the transferred wax release.

Many heat-transfer label assemblies include, in addition to the layers described above, an adhesive layer (comprising, for example, a polyamide, phenoxy, or polyester adhesive) deposited over the ink design to facilitate adhesion of the label onto a receiving article. An example of a heat-transfer label assembly having an adhesive layer is disclosed in U.S. Pat. No. 4,548,857, inventor Galante, which issued Oct. 22, 1985, and which is incorporated herein by reference. Additionally, many heat-transfer label assemblies additionally include a protective lacquer layer interposed between the wax release layer and the ink layer. An example of such a label assembly is disclosed in U.S. Pat. No. 4,426,422, inventor Daniels, which issued Jan. 17, 1984, and which is incorporated herein by reference.

One phenomenon that has been noted with heat-transfer label assemblies of the type described above containing a wax release layer is that, quite often, a degree of hazing or a "halo" is noticeable over the transferred label when the transfer is made onto clear materials. This "halo" effect, which persists despite post-flaming or post-heating and which may detract from the appearance of the label, is caused by the presence of the wax coating around the outer borders of the transferred ink design layer. Hazing due to the wax release layer may also appear in "open-copy" areas of the label, i.e., areas of the label where no ink and no protective or adhesive lacquers are present, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such approach to this problem is disclosed in U.S. Pat. No. 4,935,300, inventors Parker et al., which issued Jun. 19, 1990, and which is incorporated herein by reference. In the aforementioned Parker patent, the label assembly, which is said to be particularly well-suited for use on high density polyethylene, polypropylene, polystyrene, polyvinylchloride and polyethylene terephthalate surfaces or containers, comprises a paper carrier web which is overcoated with a layer of thermoplastic polyethylene. A protective lacquer layer comprising a polyester resin and a relatively small amount of a nondrying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described Parker label assembly substantially reduces the wax-related effects discussed previously, said label assembly does not quite possess the same release characteristics of heat-transfer label assemblies containing a wax release layer. In fact, when put to commercial use, the polyethylene release layer of the Parker label assembly was found to become adhesive when subjected to the types of elevated temperatures typically encountered during label transfer. Accordingly, another type of heat-transfer label assembly differs from the Parker heat-transfer label assembly in that a very thin layer or "skim coat" of carnauba wax is interposed between the polyethylene release layer and the protective lacquer layer to improve the release of the protective lacquer from the polyethylene-coated carrier web. The thickness of the skim coat corresponds to approximately 0.1–0.4 lbs. of the wax spread onto about 3000 square feet of the polyethylene release layer. The aforementioned "skim coat-containing" heat-transfer label assembly also differs from the Parker label assembly in that the heat-activatable adhesive of the "skim coat" label assembly is printed over the entirety of the ink and protective lacquer layers, with the peripheral edges of the adhesive layer in direct contact with the wax skim coat.

In addition to improving the release characteristics of the label assembly, the aforementioned wax skim coat also enables the label to be stretched non-uniformly, if desired, for application to articles of tapered cross-section.

An example of a "skim coat-containing" heat-transfer label assembly of the type described above is disclosed in U.S. Pat. No. 5,800,656, inventors Geurtsen et al., which issued Sep. 1, 1998, and which is incorporated herein by reference. According to one embodiment, the aforementioned Geurtsen label assembly is designed for use with silane-treated glass containers of the type that are subjected to pasteurization conditions, the label assembly including a support portion, a skim coat positioned on top of the support portion and a transfer portion positioned on top of the support portion. The support portion includes a sheet of paper overcoated with a release layer of polyethylene. The transfer portion includes an organic solvent-soluble phenoxy resin protective lacquer layer, an organic solvent-soluble polyester resin ink layer over the protective lacquer layer, and a water-dispersible acrylic adhesive resin layer over the ink and protective lacquer layers and onto a surrounding portion of the skim coat.

Examples of other "skim coat-containing" heat-transfer label assemblies are disclosed in the following U.S. patents, all of which are incorporated herein by reference: U.S. Pat. No. 6,096,408, inventors Laprade et al., issued Aug. 1, 2000; U.S. Pat. No. 6,033,763, inventors Laprade et al., issued Mar. 7, 2000; U.S. Pat. No. 6,083,620, inventors Laprade et al., issued Jul. 4, 2000; and U.S. Pat. No. 6,099,944, inventors Laprade et al., issued Aug. 8, 2000.

Although the release properties of heat-transfer label assemblies that include the aforementioned wax skim coat are much improved compared to similar heat-transfer label assemblies lacking said wax skim coat, said label assemblies do result in a portion of the wax skim coat being transferred to the article being decorated during label transfer. As a result, particularly when the labelled article is dark in color, a wax residue is often visible to the naked eye on the article around the peripheries of the label. Such a wax residue or margin, for the reasons discussed above, is undesirable from an aesthetic standpoint. In addition, said wax residue precludes the possibility of decorating articles, such as containers, with "wrap-around" labels of the type that completely encircle an object since the adhesive present at the trailing end of the label will not adhere to that portion of the article covered by the wax residue that is deposited with the leading end of the label.

SUMMARY OF THE INVENTION

It is an object of the present invention to provide a novel heat-transfer label assembly.

It is another object of the present invention to provide a heat-transfer label assembly as described above that overcomes at least some of the problems associated with existing heat-transfer label assemblies of the type described above.

In furtherance of the above and other objects to be set forth or to become apparent from the description to follow, and according to one aspect of the invention, there is provided a heat-transfer label assembly, said heat-transfer label assembly comprising:

(a) a carrier;

(b) a heat-transfer label, said heat-transfer label being positioned over said carrier for transfer of said heat-transfer label from said carrier to an article under conditions of heat and pressure, said carrier extending beyond the periphery of said heat-transfer label to yield one or more exposed areas of said carrier, said heat-transfer label comprising (i) an ink design layer, and (ii) a heat-activatable adhesive layer over said ink design; and (c) a mask positioned over at least a portion of said one or more exposed areas of said carrier and not positioned over said heat-transfer label, said mask adhering to said carrier during heat-transfer of said heat-transfer label.

In a first preferred embodiment, the carrier is a paper substrate overcoated with a layer of polyethylene, and a skim coat of wax overcoats the polyethylene layer. One or more heat-transfer labels are printed onto the skim coat and are spaced apart from one another, each heat-transfer label comprising a protective lacquer layer printed onto the slim coat, an ink design printed onto the protective lacquer layer, and a heat-activatable adhesive layer printed over the ink design, any exposed areas of the protective lacquer layer and a surrounding area of the skim coat. The periphery of the skim coat extends beyond the peripheries of the labels and is, therefore, uncovered by the labels. The mask is deposited over all of the areas of the skim coat that are left uncovered by the labels and serves to prevent a wax border from being transferred onto the decorated article around the periphery of the transferred label.

A second preferred embodiment differs from the first preferred embodiment in that the mask is not only applied to all of the areas of the skim coat that are left uncovered by the labels but is also applied to all areas of the heat-activatable adhesive layers, except for those areas of the adhesive layers positioned directly over the ink designs. As a result, those portions of the protective lacquer layers and adhesive layers that extend beyond the peripheries of the ink designs become fixed to the carrier by the mask and are not transferred during label transfer, thereby leaving only the ink designs, those portions of the protective lacquer layers positioned directly below the ink designs and those portions of the adhesive layers positioned directly above the ink designs to constitute the heat-transfer labels.

A third preferred embodiment differs from the first preferred embodiment in that the mask is only applied to areas of the skim coat that are disposed proximate to the leading end of the label. Although this embodiment does not completely eliminate the aesthetic issues associated with a wax margin (particularly along the top and bottom edges of the label), it does permit the label to be used as a "wrap-around" label.

A fourth preferred embodiment differs from the first preferred embodiment in that the assembly does not include a wax skim coat and in that the carrier comprises a polymeric substrate and a release coating, said release coating being deposited on top of the polymeric substrate. The polymeric substrate is preferably a clear polymeric film selected from the group consisting of polyesters, such as polyethylene terephthalate, polyethylene napthylene; polyolefins, such as polyethylene and polypropylene; and polyamides. The coating, which is preferably clear, is applied directly on top of the substrate and is a non-wax, non-silicone, thermoset release material that separates cleanly from the label and is not transferred, to any visually discernible degree, with the label onto an article being labeled. The coating preferably has a thickness of about 0.01 to 10 microns, more preferably about 0.02 to 1 micron, even more preferably about 0.1 micron. In addition, the coating preferably has a total surface energy of about 25 to 35 mN/m (preferably about 30 mN/m), of which about 0.1 to 4 mN/m (preferably about 1.3 mN/m) is polar surface energy. Furthermore, when analyzed by XPS (X-ray photoelectron spectroscopy), the coating preferably has a carbon content (by atomic %) of about 90 to 99.9% (preferably about 97%) and an oxygen content (by atomic %) of about 0.1 to 10% (preferably about 3%).

A fifth preferred embodiment differs from the first preferred embodiment in that the protective lacquer layer is printed over substantially the entirety of the skim coat, in that the adhesive layer is printed over the ink designs and substantially the entirety of the protective lacquer layer, and in that the mask is printed over substantially the entirety of the adhesive layer, except where the adhesive layer is positioned directly over the ink designs.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute apart of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
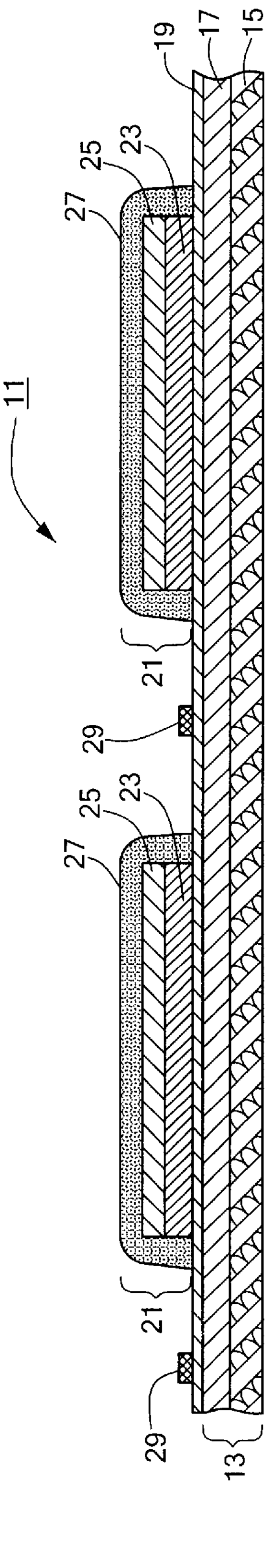
FIG. 1 PRIOR ART
FIG. 1 is a fragmentary schematic section view of a conventional heat-transfer label assembly.
Figure 2:
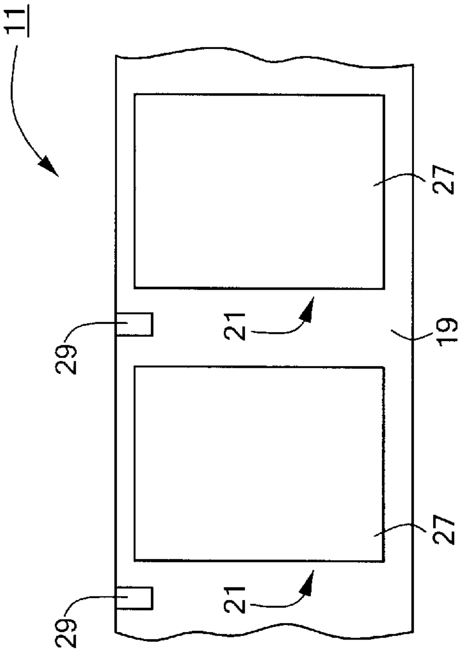
FIG. 2 PRIOR ART
FIG. 2 is a fragmentary top view of the conventional heat-transfer label assembly of FIG. 1.

Referring now to FIGS. 1 and 2, there are shown fragmentary section and fragmentary top views, respectively, of a conventional heat-transfer label assembly, said conventional heat-transfer label assembly being represented generally by reference numeral 11.

Assembly 11 comprises a carrier 13. Carrier 13, in turn, comprises a paper substrate 15 overcoated with a polyethylene layer 17. Details of polyethylene layer 17 are disclosed in U.S. Pat. Nos. 4,935,300 and 4,927,709, the disclosures of which are incorporated herein by reference.

Assembly 11 also comprises a wax skim coat 19 of the type described above, said skim coat being coated directly on top of the entirety of polyethylene layer 17. As will be explained below in greater detail, during label transfer, a portion of skim coat 19 is typically transferred along with the label onto the article being decorated, and a portion of skim coat 19 remains on top of polyethylene layer 17.

Assembly 11 further comprises a plurality of heat-transfer labels 21 (it being understood that assembly 11 may include any number of heat-transfer labels 21). Each heat-transfer label 21, in turn, includes (i) a protective lacquer layer 23 printed directly on top of a desired area of skim coat 19, (ii) an ink design layer 25 printed directly onto a desired area of lacquer layer 23, and (iii) a heat-activatable adhesive layer 27 printed directly onto ink design layer 25, any exposed portions of lacquer layer 23 and a surrounding area of skim coat 19.

The composition of protective lacquer layer 23 is typically based on the type of article being decorated and the uses to which it may be put. For example, where the article being decorated is a glass container, protective lacquer layer 23 is typically a phenoxy lacquer layer, such as that described in U.S. Pat. No. 5,800,656 (which is incorporated herein by reference), or a cross-linked phenoxy lacquer layer, such as that disclosed in U.S. Pat. No. 6,033,763 (which is incorporated herein by reference). Phenoxy protective lacquer layers are preferred for glass containers because they tend to possess a high degree of scuff resistance and a high degree of chemical resistance.

Other types of protective lacquers that may be used to form protective lacquer layer 23 are well-known in the art (see, for example, U.S. Pat. No. 4,935,300).

Ink design layer 25 of heat-transfer label 21, which layer may actually comprise either a single ink layer or a plurality of ink layers, is made using one or more conventional heat-transfer label inks, such as polyester inks, polyester/vinyl inks, polyamide inks and/or acrylic inks, as well as the phenoxy ink described in U.S. Pat. No. 6,099,944, which is incorporated herein by reference. Such inks typically comprise a resin of the type described above, a suitable pigment or dye, and one or more suitable volatile solvents. Ink design layer 25 is formed in the conventional manner by depositing, preferably by gravure printing, one or more ink compositions of the type described above onto one or more desired areas of lacquer layer 23 and, thereafter, allowing the volatile solvent(s) of the ink composition(s) to evaporate, leaving only the non-volatile ink components to form layer 25.

The composition of adhesive layer 27 is typically based on the type of article being decorated. For example, where the article is a glass container, adhesive layer 27 is typically a phenoxy adhesive, such as that described in U.S. Pat. No. 6,083,620, which is incorporated herein by reference. Other types of adhesives, such as polyester adhesives, acrylic adhesives and polyamide adhesives, are well-known in the art and may also be used to form adhesive layer 27.

Assembly 11 further comprises registration marks 29 for use in properly aligning heat-transfer labels 21 with the articles to which they are affixed. Registration marks 29 are printed directly onto skim coat 19 using one or more of the inks described above.

Figure 3:
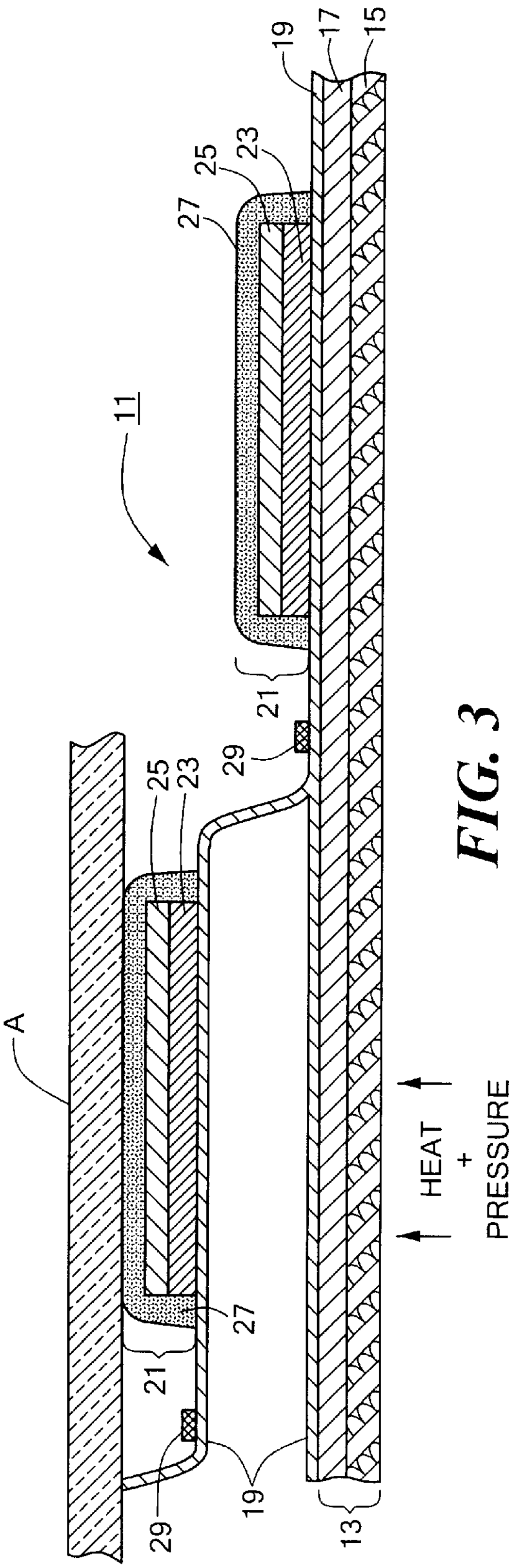
FIG. 3 PRIOR ART
FIG. 3 is a fragmentary schematic section view of the conventional heat-transfer label assembly of FIG. 1 during heat-transfer of the heat-transfer label onto a container.

Referring now to FIG. 3, there is illustrated the manner in which assembly 11 is conventionally used to transfer label 21 onto a desired article A. As can be seen, adhesive layer 27 is contacted with article A while sufficient heat (about 300 to 450° F.) is applied to the bottom of carrier 13 (i) to activate adhesive layer 27 for bonding to article A and (ii) to cause skim coat 19 to soften sufficiently to release label 21 from carrier 13.

Figure 4:
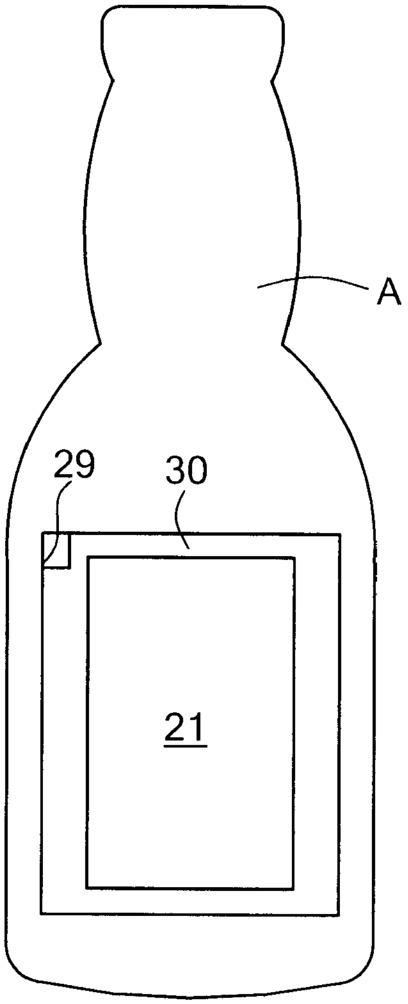
FIG. 4 PRIOR ART
FIG. 4 is a front view of a container labelled using the conventional heat-transfer label assembly of FIG. 1.

As can be seen in FIGS. 3 and 4, one of the results of decorating article A using assembly 11 is that a wax margin 30 is deposited from skim coat 19 onto the article around the periphery of label 21. (The portion of skim coat 19 positioned directly beneath label 21 is also transferred with label 21 during label transfer; however, nearly all of this wax is absorbed by label 21 during the post-transfer curing of label 21.) As explained above, the presence of margin 30 around label 21 on an article is aesthetically undesirable, particularly when the labelled article is dark in color. In addition, margin 30 precludes the possibility of decorating containers with "wrap-around" labels of the type that completely encircle an object since the adhesive present at the trailing end of the label will not adhere to that portion of the article covered by margin 30 that is deposited with the leading end of the label. Still another undesired result of using assembly 11 to decorate an article is that registration marks 29 have a tendency to transfer onto the article during label transfer.

Figure 5:
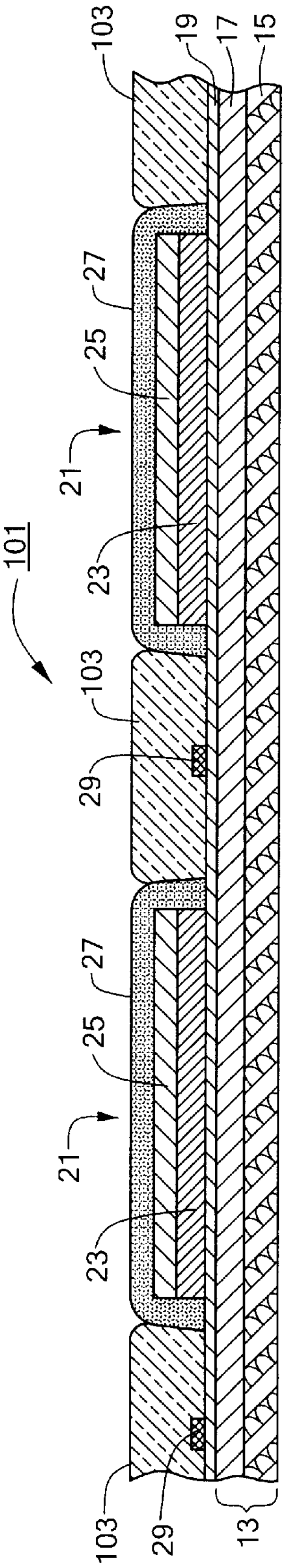
FIG. 5 is a fragmentary schematic section view of a first embodiment of a heat-transfer label assembly constructed according to the teachings of the present invention.
Figure 6:
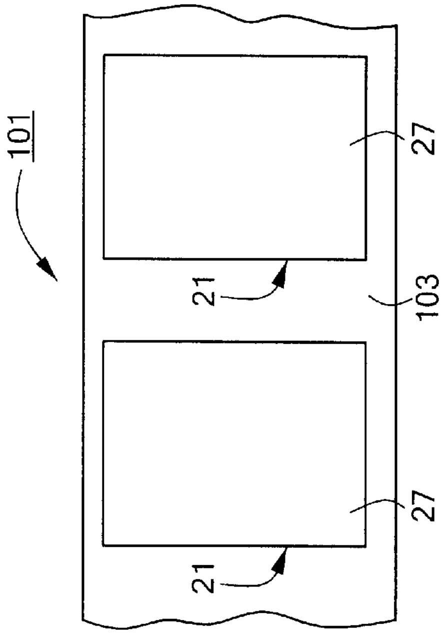
FIG. 6 is a fragmentary top view of the heat-transfer label assembly of FIG. 5.

Referring now to FIGS. 5 and 6, there are shown fragmentary section and fragmentary top views, respectively, of a first embodiment of a heat-transfer label assembly constructed according to the teachings of the present invention, said heat-transfer label assembly being represented generally by reference numeral 101.

Assembly 101 is similar in many respects to assembly 11, the principal difference between the two assemblies being that assembly 101 additionally includes a mask 103 positioned directly on top of skim coat 19 (and registration marks 29) in all non-label areas thereof, mask 103 adhering to carrier 13 through skim coat 19 (and registration marks 29) and not transferring with label 21 onto an article during label transfer. Mask 103 is preferably made by (i) printing a masking composition on top of skim coat 19 (and registration marks 29) after label 21 has been printed, said masking composition comprising (A) a resin (e.g., polyester, phenoxy, acrylic) that, when heated, bonds through skim coat 19 (and registration marks 29) to polyethylene layer 17, (B) a silica or like material for elevating the melting temperature of the composition beyond that experienced during post-printing drying and label-transfer, and (C) a heat-activatable cross-linker for cross-linking any unbonded groups of said resin so as to render said resin non-adherent to the article to be labeled, and then (ii) heating the printed masking composition to evaporate any volatile components thereof (such as a solvent) and to activate the heat-activatable cross-linker. Illustrative examples of masking compositions suitable for use in making mask 103 are provided below, said examples not being intended to limit the scope of the invention in any way.

EXAMPLE 1

| Component | Percentage by weight |
|---|---|
| BOSTIK 2700B LMW polyester resin (a thermoplastic, aromatic, linear saturated polyester resin commercially available from Bostik Inc., Middleton, MA and exhibiting high tensile and low elongation with superior scuff resistance) | 21 |
| SiLCRON G-131 fine particle silica (an aerogel-type synthetic fine particle silica commercially available from Millennium Specialty Chemicals, Baltimore, MD, and having a specific gravity of about 2.1, an average particle size of about 4.2 microns, density of about 17.5 lbs./gal., a bulking value of about 5.7 gal./100 lbs., a dry bulk density of about 6.0 lbs./cubic foot in package a loss on ignition (1000° C.) of about 6.0%, a pH (5% slurry) of about 2.8, an oil absorption of about 220 lbs./100 lbs. and a surface area of about 300 $m^2/g$) | 13 |
| CYMEL 370 partially methylated melamine-formaldehyde cross-linking resin solution (88 ± 2% nonvolatiles, iBuOH solvent, commercially available from Cytec Inc., West Paterson, NJ) | 6.3 |
| CYCAT 4040 cross-linking catalyst (solution of toluene sulfonic acid in isopropanol commercially available from Cytec Inc., West Paterson, NJ) | 2.6 |
| Methyl ethyl ketone | 57.1 |

EXAMPLE 2

| Component | Percentage by weight |
|---|---|
| PAPHEN PKHM 301 phenoxy resin (a modified poly(hydroxyether) resin commercially available from Phenoxy Associates, Rock Hill, SC) | 13.5 |
| SiLCRON G-131 fine particle silica | 11.5 |
| CYMEL 370 partially methylated melamine-formaldehyde cross-linking resin | 6.25 |
| NACURE 3525 latent catalyst (solution of dinonylnaphthalene disulfonic acid, compound with amine, in isopropyl alcohol and isobutyl alcohol, said solution being commercially available from King Industries, Inc., Norwalk, CT) | 1.2 |
| Methyl ethyl ketone | 45.55 |
| Toluene | 22 |

EXAMPLE 3

| Component | Percentage by weight |
|---|---|
| DIANAL MB 2752 acrylic copolymer (Dianal America Inc., Pasadena, TX) | 24.5 |
| CYMEL 370 partially methylated melamine-formaldehyde cross-linking resin | 6.75 |

-continued

| Component | Percentage by weight |
|---|---|
| SiLCRON G-131 fine particle silica | 6 |
| OK 412 silicon dioxide (Degussa Corporation, Ridgefield Park, NJ) | 6 |
| NACURE 3525 latent catalyst | 1.5 |
| Methyl ethyl ketone | 35.25 |
| Normal propyl acetate | 20 |

The relative amounts of each component of the three exemplary formulations described above may be modified by up to about ±10–15%.

The masking composition of the present invention may further include a colorant to facilitate, among other things, proper registration of the mask during printing and inspection of the mask after printing. Moreover, by adding a suitable colorant, such as titanium dioxide, to the masking composition, a dual purpose composition may be used both as a masking composition for use in forming mask 103 and as ink for use in forming ink design layer 25. An advantage to such a dual purpose masking formulation is that the masking composition does not require the reassignment of one of the printing stations that would have otherwise been available for printing the ink design layer for printing the mask; consequently, such a dual purpose masking formulation enables as large a number as possible of different colored inks to be used in ink design layer 25. An example of a dual purpose ink/masking composition is as follows:

| Component | Percentage by weight |
|---|---|
| VITEL 2250 polyester resin (commercially available from Bostik Inc., Middleton, MA and having a molecular weight average of 35,000–45,000) | 25 |
| UNITANE OR-600 titanium dioxide (Kemira, Inc., Savannah, GA) | 24 |
| SiLCRON G-131 fine particle silica | 7.7 |
| CYMEL 370 partially methylated melamine-formaldehyde cross-linking resin | 4 |
| NACURE 3525 latent catalyst | 1 |
| Toluene | 16.8 |
| Normal propyl acetate | 11.2 |
| Methyl ethyl ketone | 10.3 |

It should be understood that, where a dual purpose composition of the type described above is used both to form the mask and to form a design layer, the mask and the design layer are typically printed at the same time at the same print station. This differs from the situation discussed above in which separate ink and masking compositions are used, and the mask is typically printed at a separate printing station after the printing of ink design layer 25 and adhesive layer 27.

Figure 7:
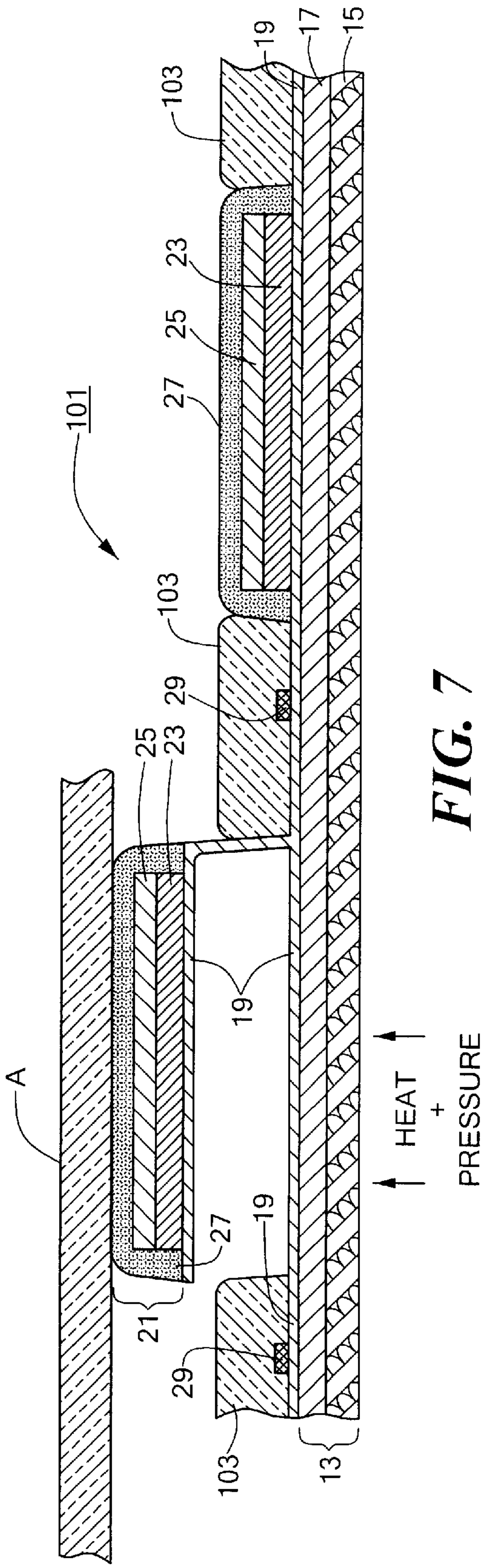
FIG. 7 is a fragmentary schematic section view of the heat-transfer label assembly of FIG. 5 during heat-transfer of the heat-transfer label onto a container.
Figure 8:
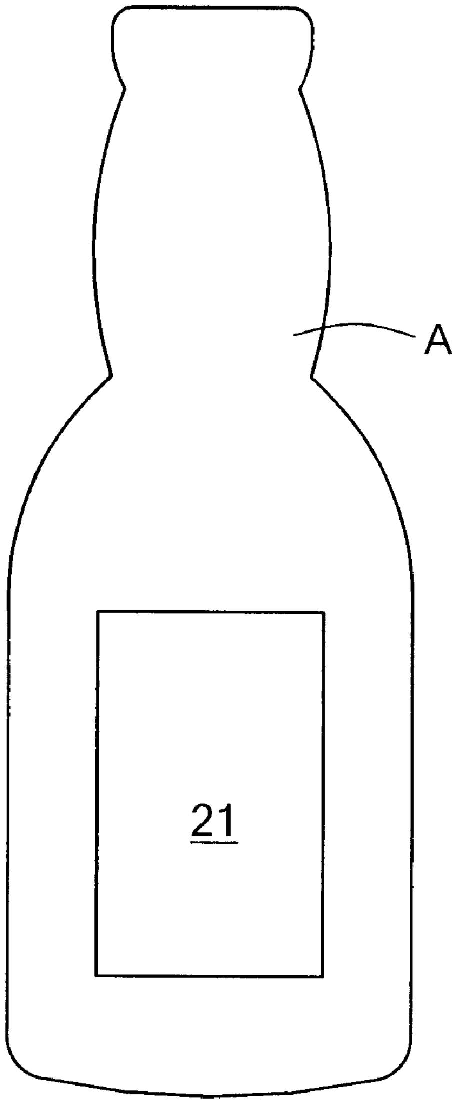
FIG. 8 is a front view of a container labelled using the heat-transfer label assembly of FIG. 5.

Referring now to FIG. 7, there is shown the manner in which assembly 101 may be used to decorate a desired article. As can be seen, adhesive layer 27 is contacted with the article while heat is applied to the bottom of carrier 13. The application of heat to carrier 13 causes adhesive layer 27 to become activated for bonding to the desired article and causes that portion of skim coat 19 directly beneath label 21 to break apart, thereby releasing label 21 from carrier 13. By contrast, the non-label areas of skim coat 19, which are covered by mask 103, do not break apart when heated and, consequently, are not transferred to the article during label transfer. As a result, as seen in FIG. 8, all that is transferred to the article is label 21, without an accompanying wax margin. (A portion of skim coat 19 directly under label 21 is transferred with label 21 but is absorbed into label 21 during post-transfer curing.)

In addition to being devoid of a wax margin and its attendant aesthetic deficiencies, assembly 101 can also be used to decorate articles with "wrap-around" labels of the type described above since assembly 101 leaves no margin of wax on the article with the leading end of the label that will interfere with the bonding of the adhesive to the article at the trailing end of the label. Another benefit associated with assembly 101 is that registration marks 29, which are covered by mask 103, do not transfer onto the article during label transfer. Still another benefit associated with assembly 101 is that mask 103 prevents polyethylene layer 17 (which can become tacky under label transfer conditions) from adhering in non-label areas to the decorated article during label transfer.

Assembly 101, like assembly 11, can be used to decorate articles of tapered or non-tapered cross-section.

Figure 9:
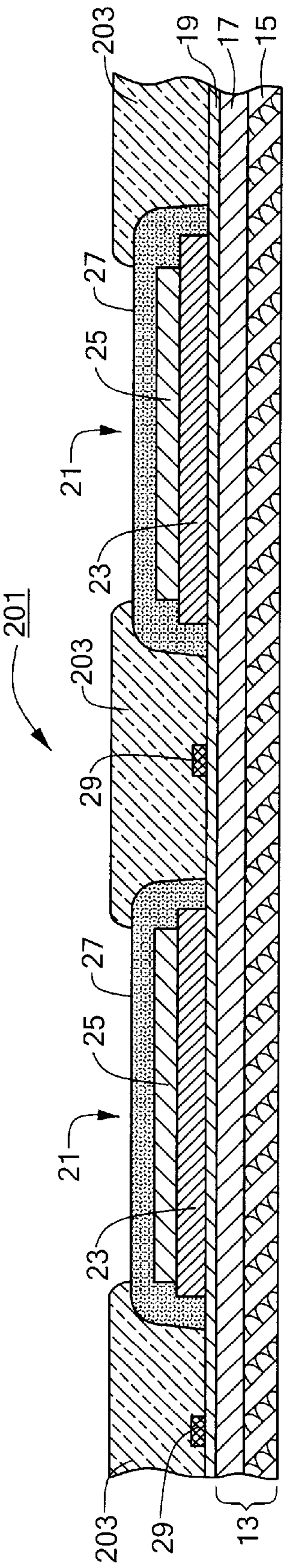
FIG. 9 is a fragmentary schematic section view of a second embodiment of a heat-transfer label assembly constructed according to the teachings of the present invention.
Figure 10:
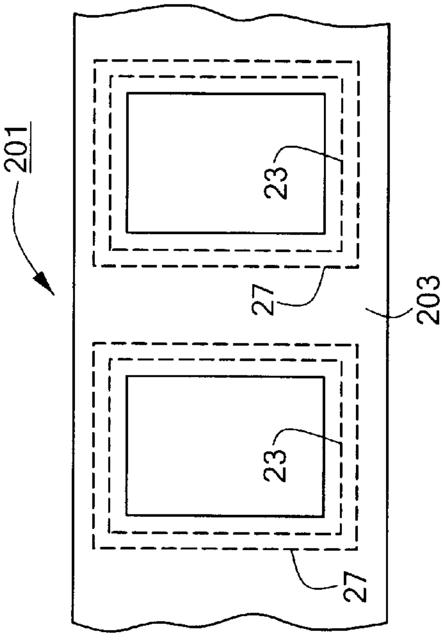
FIG. 10 is a fragmentary top view of the heat-transfer label assembly of FIG. 9, the boundaries of the adhesive and protective lacquer layers therein being shown in phantom.

Referring now to FIGS. 9 and 10, there are shown fragmentary section and fragmentary top views of a second embodiment of a heat-transfer label assembly constructed according to the teachings of the present invention, said heat-transfer label assembly being represented generally by reference numeral 201.

Assembly 201 is similar in many respects to assembly 101, the principal difference between the two assemblies being that assembly 201 comprises a mask 203, mask 203 being identical in chemical composition to mask 103 but being sized to ink design layer 25 (as compared to mask 103, which is sized to adhesive layer 27). As a result, those portions of protective lacquer layer 23 and adhesive layer 27 that extend beyond the periphery of ink design layer 23 become fixed to carrier 13 by mask 103 and are not transferred during label transfer, with the remainders of protective lacquer layer 23 and adhesive layer 27 being sized to ink design layer 25 and, together with ink design layer 25, constituting the heat-transfer label.

As can readily be appreciated, instead of having mask 203 sized to ink design layer 25, mask 203 could be sized to protective lacquer layer 23.

Figure 11:
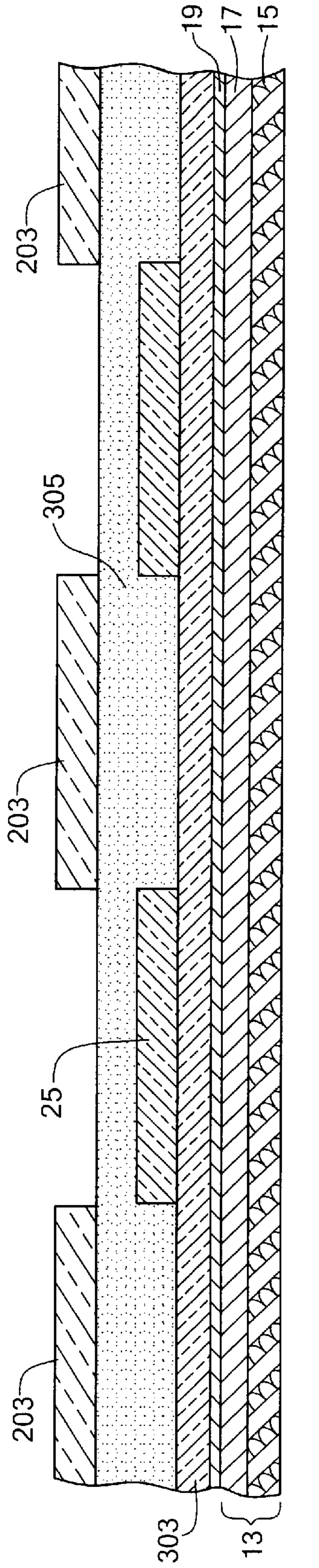
FIG. 11 is a fragmentary schematic section view of a third embodiment of a heat-transfer label assembly constructed according to the teachings of the present invention.
Figure 12:
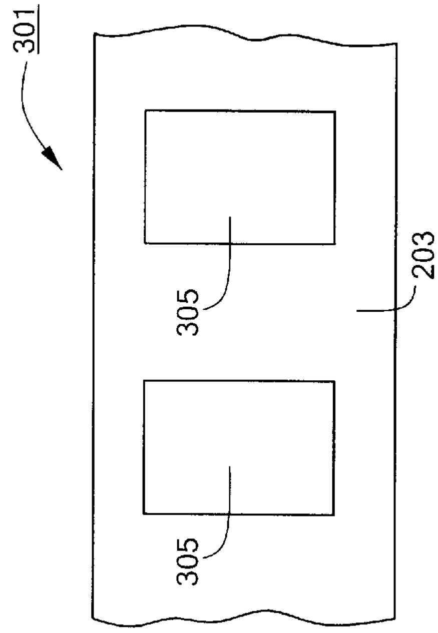
FIG. 12 is a fragmentary top view of the heat-transfer label assembly of FIG. 11.

Referring now to FIGS. 11 and 12, there are shown fragmentary section and fragmentary top views of a third embodiment of a heat-transfer label assembly constructed according to the teachings of the present invention, said heat-transfer label assembly being represented generally by reference numeral 301.

Assembly 301 is similar in certain respects to assembly 201, one of the principal differences between the two assemblies being that assembly 301 includes a protective lacquer layer 303, protective lacquer layer 303 being identical in chemical composition to protective lacquer layer 23 but being applied over the substantial entirety of skim coat 19. Another difference between assembly 301 and assembly 201 is that assembly 301 includes an adhesive layer 305, adhesive layer 305 being identical in chemical composition to adhesive layer 27 but being substantially coextensive with protective lacquer layer 303. Like assembly 201, assembly 301 includes mask 203, mask 203 being sized to ink design layer 25. Consequently, the transferred label is sized to ink design layer 25.

Because protective lacquer layer 303 and adhesive layer 305 are printed over substantially the entirety of skim coat 19 in assembly 301, one of the advantages of assembly 301, as compared to assemblies 101 and 201, is that the need to precisely print in register each of the constituent layers of the label is obviated. Another advantage is that the combination of carrier 13, skim coat 19 and protective lacquer layer 303 can be pre-fabricated in bulk, thereby freeing-up for the ink design layer 25 the printing station that is ordinarily needed for printing the protective lacquer layer.

It should be understood that, if a dual purpose ink/masking composition is used in assembly 301, said dual purpose composition preferably should not be printed directly on top of that portion of protective lacquer layer 303 forming a part of the label; instead, one or more additional ink or other layers preferably should be interposed therebetween to guard against said dual purpose composition in the label from bonding to carrier 13 through layer 303.

Figure 13:
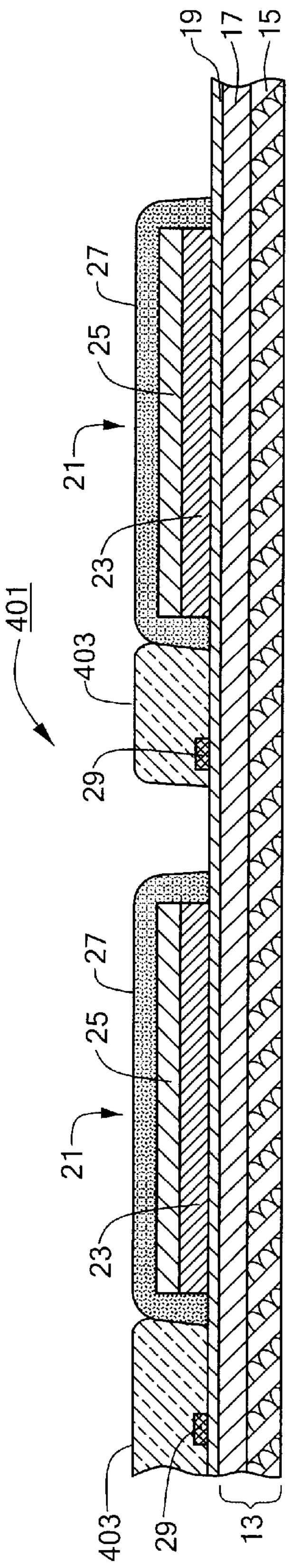
FIG. 13 is a fragmentary schematic section view of a fourth embodiment of a heat-transfer label assembly constructed according to the teachings of the present invention.
Figure 14:
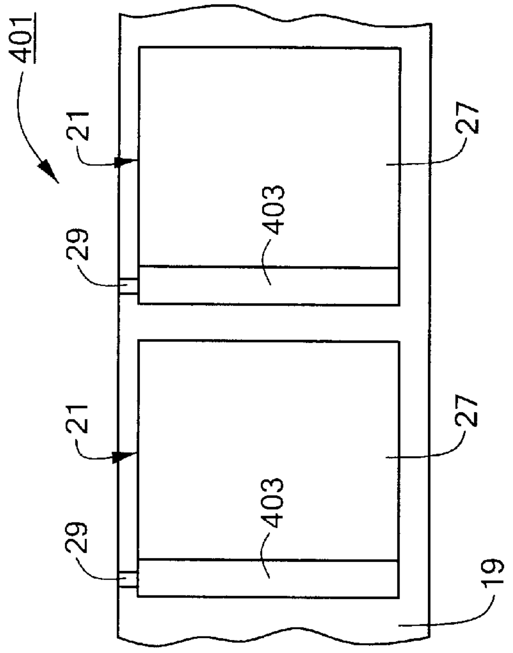
FIG. 14 is a fragmentary top view of the heat-transfer label assembly of FIG. 13.

Referring now to FIGS. 13 and 14, there are shown fragmentary section and fragmentary top views of a fourth embodiment of a heat-transfer label assembly constructed according to the teachings of the present invention, said heat-transfer label assembly being represented generally by reference numeral 401.

Assembly 401 is similar in many respects to assembly 101, the principal difference between the two assemblies being that assembly 401 comprises a mask 403, mask 403 being identical in composition to mask 101 but being disposed only along the leading end of label 21 to prevent a wax margin from being deposited therewith and, thus, to facilitate use of label 21 as a "wrap-around" label. As can readily be appreciated, because mask 403 is confined to the area along the leading end of label 21, the transferred label will not be completely devoid of a wax margin and its associated aesthetic shortcomings, particularly along its top and bottom edges (and along its trailing end where the label is not used as a wrap-around label and, consequently, the wax from the trailing end of the label is not absorbed by the leading end of the label during post-transfer curing).

As can readily be appreciated, instead of being confined to the area along the leading end of label 21, mask 403 could extend completely between the leading end of one label and the trailing end of its adjacent label.

Figure 15:
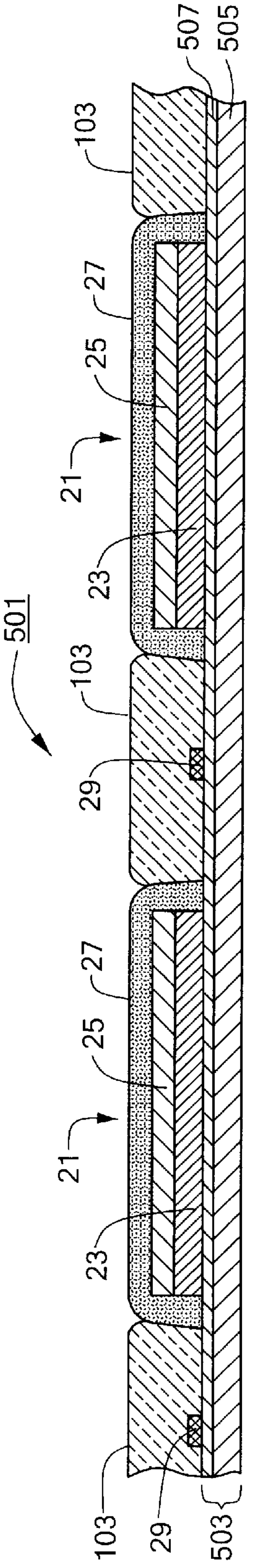
FIG. 15 is a fragmentary schematic section view of a fifth embodiment of a heat-transfer label assembly constructed according to the teachings of the present invention.

Referring now to FIG. 15, there is shown a fragmentary section view of a fifth embodiment of a heat-transfer label assembly constructed according to the teachings of the present invention, said heat-transfer label assembly being represented generally by reference numeral 501.

Assembly 501 is similar in many respects to assembly 101, the principal difference between the two assemblies being that assembly 501 comprises a carrier 503, instead of carrier 13, and does not comprise a skim coat 19. Carrier 503 comprises a polymeric substrate 505 and a release coating 507 deposited on top of polymeric substrate 505. Substrate 505 is preferably a polymeric film selected from the group consisting of polyesters, such as polyethylene terephthalate, polyethylene napthylene; polyolefins, such as polyethylene and polypropylene; and polyamides.

More preferably, substrate 505 is a clear plastic film of the type described above. As can readily be appreciated, one benefit to using a clear material as substrate 505 is that, if desired, one can inspect the quality of the printed matter of the label by looking at said printed matter through substrate 505 (from which perspective said printed matter appears as it will on the labelled article), as opposed to looking at said printed matter through the adhesive layer of the label (from which perspective said printed matter appears as the mirror image of what will appear on the labelled article).

A particularly preferred plastic material for use as substrate 505 is a clear polyester film, such as a clear polyethylene terephthalate (PET) film. This is because, at least as compared to some other plastic materials like polyethylene and polypropylene, polyester is a strong plastic material and makes a good substrate to be printed onto. In addition, unlike polyethylene, polyester does not tend to soften and become tacky at the types of temperatures typically encountered during heat-transfer. Typically, substrate 505 has a thickness of about 1–2 mil.

Coating 507 is preferably applied directly on top of substrate 505. Coating 507 is a thermoset release material that separates cleanly from label 21 and is not transferred, to any visually discernible degree, with label 21 onto an article being labeled. (For purposes of the present specification and claims, the term "visually discernible" is to be construed in terms of an unaided or naked human eye.) Preferably, release coating 507 is clear for the same types of reasons given above in connection with substrate 505.

Coating 507 does not contain any waxes or any silicones, except to the limited extent provided below, and the terms "non-wax" and "non-silicone," when used in the present specification and claims to describe and to define the present release layer or coating, are defined herein to exclude from said release layer or coating the presence of any and all waxes and silicones not encompassed by the limited exceptions provided below or described in PCT Application No. PCT/US00/17703, filed Jun. 28, 2000, the disclosure of which is incorporated herein by reference.

Coating 507 preferably has a thickness of about 0.01 to 10 microns, more preferably about 0.02 to 1 micron, even more preferably about 0.1 micron. In addition, coating 507 preferably has a total surface energy of about 25 to 35 mN/m (preferably about 30 mN/m), of which about 0.1 to 4 mN/m (preferably about 1.3 mN/m) is polar surface energy. Furthermore, when analyzed by XPS (X-ray photoelectron spectroscopy), coating 507 preferably has a carbon content (by atomic %) of about 90 to 99.9% (preferably about 97%) and an oxygen content (by atomic %) of about 0.1 to 10% (preferably about 3%). Accordingly, coating 507 is predominantly a hydrocarbon in its chemical makeup.

An example of a coated polymer film suitable for use as carrier 503 of the present invention is available from DuPont Corp. (Wilmington, Del.) as product number 140AXM 701 (140 gauge coated polyester film). Other coated polymer films which may be used as carrier 503 are described in European Patent Application No. 819,726, published Jan. 21, 1998, which document is incorporated herein by reference. The aforementioned European patent application teaches a coated film structure preferably comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Although the above-described polymeric film surface is preferably formed of a polyester, a polyolefin, or a polyamide, it may be formed form any material capable of being formed into a sheet or film. The polymeric film surface should be capable of binding or reacting with an acid-functionalized α-olefin copolymer to form a modified film base.

The above-mentioned polymer films can be manufactured by an extrusion process, such as a cast film or blown film process. In a cast film process, the polymer resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum. Alternatively, the extrudate can be blown in a conventional blown film process. Regardless of the process, however, the polyester sheet is preferably uniaxially or biaxially (preferably biaxially) stretched in the direction of film travel (machine direction) and/or perpendicular to the machine direction (traverse direction), while being heated to a temperature in the range of from about 80° C. to 160° C., preferably about 90° C. to 110° C., the degree of stretching may range from 3.0 to 5.0 times the original cast sheet unit dimension, preferably from about 3.2 to about 4.2 times the original cast sheet dimension. Reaction with the newly generated polymer film surfaces formed during stretching preferably occurs at temperatures about 130° C. or higher.

Additives such as coating aids, wetting aids such as surfactants (including silicone surfactants), slip additives, antistatic agents can be incorporated into the primer coating in levels from 0 to 50% based on the total weight of additive-free coating solids.

The above-described primer coating may additionally be applied to the bottom surface of the polymeric film for use in preventing the adhesive layer of a label from adhering to the underside of carrier 503 when a label assembly comprising a plurality of labels on a single carrier 503 is wound into a roll.

Instead of having the composition described above, coating 507 could have the composition of release layer 17 of U.S. patent application Ser. No. 09/344,778, filed Jun. 25, 1999, the disclosure of which is incorporated by reference. Alternatively, carrier 503 could be replaced with a single polymeric film, such as a polyethylene, polypropylene or polyester film.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label assembly, said heat-transfer label assembly comprising:

(a) a carrier;

(b) a heat-transfer label, said heat-transfer label being positioned over said carrier for transfer of said heat-transfer label from said carrier to an article under conditions of heat and pressure, said carrier extending beyond the periphery of said heat-transfer label to yield one or more exposed areas of said carrier, said heat-transfer label comprising (i) an ink design layer, and (ii) a heat-activatable adhesive layer over said ink design layer; and (c) a mask positioned over at least a portion of said one or more exposed areas of said carrier and not positioned over said heat-transfer label, said mask adhering to said carrier during heat-transfer of said heat-transfer label.

2. The heat-transfer label assembly as claimed in claim 1 further comprising a wax skim coat, said wax skim coat being positioned over said carrier and being positioned under each of said heat-transfer label and said mask.

3. The heat-transfer label assembly as claimed in claim 2 wherein said carrier comprises a paper substrate overcoated with a layer of polyethylene.

4. The heat-transfer label assembly as claimed in claim 3 wherein said heat-transfer label further comprises a protective lacquer layer, said ink design layer being positioned over said protective lacquer layer.

5. The heat-transfer label assembly as claimed in claim 1 wherein said carrier comprises a polymeric film overcoated with a release coating made of a non-wax, non-silicone, thermoset release material, said release coating having a total surface energy of about 25 to 35 mN/m, of which about 0.1 to 4 mN/m is polar surface energy, and having a carbon content (by atomic %) of about 97% and an oxygen content (by atomic %) of about 3%, as measured by X-ray photoelectron spectroscopy.

6. The heat transfer label assembly as claimed in claim 5 wherein said polymeric film is made of a polymer selected from the group consisting of polyesters, polyolefins and polyamides and wherein said release coating is made by (i) applying to the polymeric film in its amorphous or semi-oriented state a composition comprising (a) a functionalized α-olefin containing copolymer and (b) a crosslinking agent; and (ii) reacting said composition with the carrier during uniaxial or biaxial stretching and heat setting.

7. The heat-transfer label assembly as claimed in claim 6 wherein said carrier is in direct contact with each of said heat-transfer label and said mask.

8. The heat-transfer label assembly as claimed in claim 1 wherein said heat-transfer label further comprises a protective lacquer layer, said ink design layer being positioned over said protective lacquer layer.

9. The heat-transfer label assembly as claimed in claim 1 wherein said mask is positioned over all of said one or more exposed areas of said carrier.

10. The heat-transfer label assembly as claimed in claim 9 wherein each of said ink design layer and said heat-activatable adhesive layer has a periphery, the periphery of said heat-activatable adhesive layer extending beyond the periphery of said ink design layer.

11. The heat-transfer label assembly as claimed in claim 9 wherein each of said ink design layer and said heat-activatable adhesive layer has a periphery, the periphery of said heat-activatable adhesive layer matching the periphery of said ink design layer.

12. The heat-transfer label assembly as claimed in claim 1 wherein said heat-transfer label has a leading end, wherein one of said one or more exposed areas of said carrier is located along the leading end of said transfer label and wherein said mask is positioned only over said exposed area along the leading end of said heat-transfer label.

13. The heat-transfer label assembly as claimed in claim 1 wherein said mask is formed by (i) printing a masking composition on top of said one or more exposed areas of said carrier extending beyond the periphery of said heat-transfer label, said masking composition comprising (A) a resin that, when heated, bonds to said carrier; (B) a silica; and (C) a heat-activatable cross-linker for cross-linking said resin so as to render said resin non-adherent to an article to be labeled, and then (ii) heating the printed masking composition to bond said resin to said carrier and to activate said heat-activatable cross-linker.

14. The heat-transfer label assembly as claimed in claim 13 wherein said masking composition further comprises a catalyst for said heat-activatable cross-linker.

15. The heat-transfer label assembly as claimed in claim 13 wherein said resin is selected from the group consisting of a phenoxy resin, a polyester resin and an acrylic resin and wherein said heat-activatable cross-linker comprises a partially methylated melamine-formaldehyde cross-linking resin.

16. The heat-transfer label assembly as claimed in claim 15 wherein said masking composition further comprises a colorant.

17. The heat-transfer label assembly as claimed in claim 1 wherein said carrier is a single polymeric film.

18. The heat-transfer label assembly as claimed in claim 17 wherein said single polymeric film is made of a material selected from the group consisting of polyethylene, polypropylene and polyester.

19. A heat-transfer label assembly, said heat-transfer label assembly comprising:

(a) a carrier;

(b) a protective lacquer layer over said carrier;

(c) an ink design printed on said protective lacquer layer, said protective lacquer layer extending beyond the periphery of said ink design;

(d) a heat-activatable adhesive layer deposited over said ink design and at least a portion of said protective lacquer layer; and (e) a mask deposited at least over said heat-activatable adhesive layer, except for that portion of said heat-activatable adhesive layer positioned directly over said ink design, said mask adhering to said carrier under conditions of heat and pressure;

(f) whereby said ink design, together with that portion of said heat-activatable adhesive layer positioned directly over said ink design and that portion of said protective lacquer layer positioned directly below said ink design, collectively form a heat-transfer label.

20. The heat-transfer label assembly as claimed in claim 19 wherein said heat-activatable adhesive layer is deposited over said ink design and all exposed portions of said protective lacquer layer.

21. The heat-transfer label assembly as claimed in claim 19 wherein said carrier comprises a paper substrate overcoated with a layer of polyethylene, said heat-transfer label assembly further comprising a wax skim coat overcoating said layer of polyethylene, said protective lacquer layer overcoating said skim coat.

22. A heat-transfer label assembly, said heat-transfer label assembly comprising:

(a) a carrier;

(b) a wax skim coat overcoating said carrier;

(c) a protective lacquer layer printed onto a portion of said wax skim coat;

(d) an ink design printed onto said protective lacquer layer;

(e) a heat-activatable adhesive layer printed over the entirety of said ink design, as well as being printed over any exposed areas of said protective lacquer layer, the periphery of said heat-activatable adhesive layer extending beyond the periphery of said protective lacquer layer, the periphery of said wax skim coat extending beyond the periphery of said adhesive layer to yield an exposed skim coat; and (f) a mask deposited at least over a portion of said exposed skim coat, but not deposited over that portion of said heat-activatable adhesive layer positioned directly over said ink design, said mask adhering to said carrier under conditions of heat and pressure.

23. The heat-transfer label assembly as claimed in claim 22 wherein said mask is deposited over the entirety of said exposed skim coat, but not over any of said heat-activatable adhesive layer, whereby said heat-activatable adhesive layer, said ink design and said protective lacquer layer collectively form a heat-transfer label.

24. The heat-transfer label assembly as claimed in claim 22 wherein said mask is deposited over the entirety of said exposed skim coat and over that portion of said heat-activatable adhesive layer not positioned directly over said ink design, whereby said ink design, that portion of said heat-activatable adhesive layer positioned directly over said ink design and that portion of said protective lacquer layer positioned directly under said ink design collectively form a heat-transfer label.

25. The heat-transfer label assembly as claimed in claim 22 wherein said ink design, said protective lacquer layer and said heat-activatable adhesive layer collectively form a heat-transfer label having a leading end, wherein a portion of said exposed skim coat is disposed along the leading end of said heat-transfer label, and wherein said mask is deposited only on said exposed skim coat along the leading end of said heat-transfer label.

26. The heat-transfer label assembly as claimed in claim 22 wherein said carrier comprises a sheet of paper overcoated with a layer of polyethylene.

* * * * *

UNITED STATES PATENT AND TRADEMARK OFFICE
CERTIFICATE OF CORRECTION

PATENT NO. : 6,537,651 B2
DATED : March 25, 2003
INVENTOR(S) : Geurtsen et al.

It is certified that error appears in the above-identified patent and that said Letters Patent is hereby corrected as shown below:

Column 4,
Line 8, "slim" should be -- skim --.

Column 5,
Line 34, "apart" should be -- a part --.

Column 13,
Line 10, "form" should be -- from --.
Line 64, "is" should be -- are --.

Column 15,
Line 4, "said transfer label" should be -- said heat-transfer label --.

Signed and Sealed this

Third Day of February, 2004

JON W. DUDAS
*Acting Director of the United States Patent and Trademark Office*